UNITED STATES PATENT OFFICE.

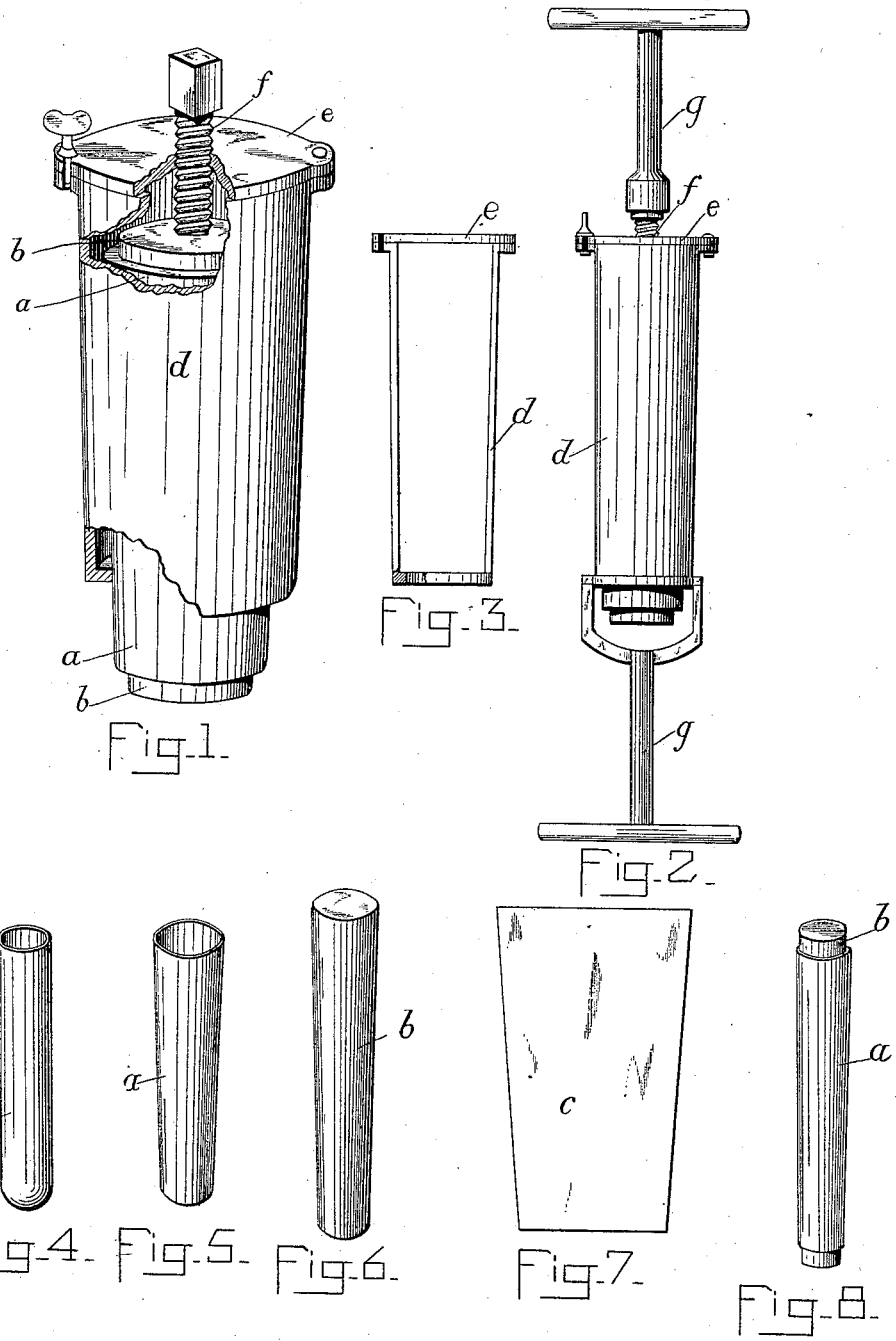

HENRY T. SMITH, OF PROVIDENCE, RHODE ISLAND, ASSIGNOR, BY DIRECT AND MESNE ASSIGNMENTS, TO ROSWELL C. SMITH, TRUSTEE, OF SAME PLACE.

ART OF MAKING INGOTS FOR JEWELERS' USE.

SPECIFICATION forming part of Letters Patent No. 427,924, dated May 13, 1890.

Application filed February 14, 1890. Serial No. 340,407. (No model.)

*To all whom it may concern:*

Be it known that I, HENRY T. SMITH, of Providence, in the county of Providence and State of Rhode Island, have invented certain new and useful Improvements in the Art of Manufacturing Ingots, &c., for Jewelers' Use, of which the following is a specification.

It is well known by those skilled in the art that in the formation of ingots for the manufacture of wire, &c., for jewelers' use, in which gold or a high-grade metal is used on the outside and copper or a comparatively base metal is employed as a core, or as the interior material, it is necessary that a perfect union of the two metals should be effected in the ingot; otherwise the product formed from the ingot, which is usually accomplished by drawing the latter down to a small size, will be imperfect. The union of the two metals is commonly accomplished by soldering and the application of heat and pressure; but as it is expedient to make the ingots of cylindrical form it is very difficult to apply pressure uniformly at all points on the outside shell, (a thing that is also essential to the formation of perfect work.)

By my improvements I am enabled to overcome the difficulties before mentioned and to apply pressure uniformly at all points upon the outside shell in the soldering operation, and so effect a perfect union of the core with the shell.

My invention will first be described in connection with the accompanying drawings and then pointed out in the claims.

Figures 1, 2, and 3 represent means which may be employed in the carrying out of my improved process. Figs. 4, 5, 6, 7, and 8 are diagrams which serve to illustrate the steps pursued by me in my process of forming my improved ingots.

In the carrying out of my process I first form a cylindrical shell of gold or comparatively high-grade metal, like that shown in Fig. 4, by drawing it up in dies or constructing it in other suitable way. I then cut off the closed end, and by means of a die or other devices form the shell $a$ into a tapering tube like that shown in Fig. 5, making the smaller end, say, one-sixteenth smaller than the larger end. I then construct a core $b$, of copper or other comparatively base metal, of the form corresponding to the interior of the shell shown in Fig. 5. I then take a sheet of rolled hard solder $c$, of a form that will completely surround the core $b$—say of a shape like that shown in Fig. 7—and wrap the same around the core, or fit the solder into the shell, and place the core with the solder wrapped around it in the shell $a$, as shown in Fig. 8. The ingot so formed I then place in a clamp consisting of a metallic cylinder $d$, like that shown in Figs. 1 and 2, thereby protecting the surface of the cylindrical gold shell from the fire. The frame thus formed is constructed with a cover $e$, which may be placed thereover and secured thereon by means of screws or otherwise. A screw-threaded rod $f$ is tapped into the cover $e$ and adapted to be screwed down upon the upper and larger end of the core $b$, as is clearly represented in Fig. 1, thereby forcing the core firmly into the shell. After so arranging the ingot in the frame I heat the latter in any suitable manner to a degree which will cause the solder to run, when I screw down the rod $f$ upon the upper and larger end of the core $b$, so as to press the latter into the shell $a$, with the result of applying pressure between the core and the shell and forcing out from between all of the surplus solder and effecting a perfect union of the two parts.

If need be, I may apply a wrench $g$ to the upper end of the rod $f$ and to the lower end of the cylinder or frame $d$, as represented in Fig. 2, which contrivances will afford convenient means for a manipulation of the frame and core in heating the same, as also in screwing down the rod $f$ to apply pressure to the top of the core $d$.

Other means than that herein shown, it is obvious, may be employed in carrying out my improvement, though that described by me has been found efficient for the purpose.

If the core should extend beyond the ends of the shell, as shown in Fig. 8, after the soldering is effected, it may be trimmed off, if desired, before the ingot is drawn out into wire or other articles of manufacture.

Having thus described my invention, what I claim is—

1. The improvement in the art of forming and soldering ingots for seamless wire for jewelers' use, which consists in forming a shell of gold or other high-grade metal of tapering form, then constructing a core of baser metal of a form corresponding to the interior of the shell, then placing solder between the core and shell, then heating the ingot so formed to a degree sufficient to melt the solder, and then applying pressure by screw or other means to the larger end of the core and forcing it into the shell, thereby forcing out all surplus solder, substantially as set forth.

2. The improvement in the art of soldering a tapering shell to a tapering core in the making of compound ingots, which consists in applying solder between the shell and core, heating the ingot to fuse the solder, and while the solder is in a fused state applying pressure to the larger end of the core, as set forth.

In testimony whereof I have signed my name to this specification, in the presence of two subscribing witnesses, this 11th day of February, A. D. 1890.

HENRY T. SMITH.

Witnesses:
ROBERT W. BURBANK,
CHARLES D. WOOD.